United States Patent

Angermann et al.

(10) Patent No.: US 6,478,858 B2
(45) Date of Patent: Nov. 12, 2002

(54) DESORBABLE SORPTION FILTER SUITABLE FOR A MOTOR VEHICLE HEATING OR AIR-CONDITIONING SYSTEM

(75) Inventors: Hans-H. Angermann, Stuttgart (DE); Roland Burk, Stuttgart (DE); Herbert Damsohn, Aichwald (DE); Klaus Luz, Herrenberg (DE); Tilo Rinckleb, Tamm (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/758,130

(22) Filed: Jan. 12, 2001

(65) Prior Publication Data

US 2001/0015131 A1 Aug. 23, 2001

(30) Foreign Application Priority Data

Jan. 13, 2000 (DE) .......................... 100 01 043

(51) Int. Cl.$^7$ ............................... B01D 53/04
(52) U.S. Cl. ................... 96/143; 55/490.1; 55/491; 55/525; 55/DIG. 5
(58) Field of Search .................. 95/90, 148, 283, 95/106, 114; 96/146, 154, 126, 143; 55/385.3, 490.1, 491, 492, 525, 521, DIG. 5, 360

(56) References Cited

U.S. PATENT DOCUMENTS

| | | | |
|---|---|---|---|
| 2,160,003 A | * 5/1939 | Slayter et al. | |
| 3,086,759 A | * 4/1963 | Goettl | |
| 3,287,003 A | * 11/1966 | Goettl | |
| 4,693,048 A | * 9/1987 | Guetersloh | |
| 4,737,174 A | * 4/1988 | Pontius | |
| 5,085,266 A | * 2/1992 | Arold et al. | 165/119 |
| 5,308,457 A | * 5/1994 | Dalla Betta et al. | 422/169 |
| 5,338,253 A | * 8/1994 | Damsohn et al. | |
| 5,679,122 A | * 10/1997 | Moll et al. | 55/497 |
| 5,827,355 A | 10/1998 | Wilson et al. | 95/114 |
| 6,197,097 B1 | * 3/2001 | Ertl et al. | 96/129 |

FOREIGN PATENT DOCUMENTS

| | | |
|---|---|---|
| DE | 40 30 144 | 4/1992 |
| DE | 42 25 272 | 2/1994 |
| DE | 43 04 077 | 8/1994 |
| DE | 195 12 844 | 10/1996 |
| DE | 195 17 016 | 11/1996 |
| DE | 19548281 A1 | * 6/1997 |
| DE | 198 05 011 | 8/1999 |
| DE | 19949010 A1 | * 2/2001 |
| JP | 63-100915 A | * 5/1988 |

OTHER PUBLICATIONS

Abstract, "Production of Filter Element", JP 63–147512, Jun. 20, 1988.

* cited by examiner

Primary Examiner—David A. Simmons
Assistant Examiner—Frank M. Lawrence
(74) Attorney, Agent, or Firm—Foley & Lardner

(57) ABSTRACT

A desorbable sorption filter, in particular for a heating or air-conditioning system of a motor vehicle, has a metallic support (12) which can be heated by flow of current and an adsorber (14) mounted at or on the support (12). To provide an improved, directly heatable sorption filter which particularly enables inexpensive production and good electrical and thermal conductive contact without the use of adhesives, it is proposed for the adsorber (14) to be of planar design and to be mechanically connected to the support (12, 112) by means of holding elements (26) formed integrally on the support (12, 112).

18 Claims, 4 Drawing Sheets

DESORBABLE SORPTION FILTER SUITABLE FOR A MOTOR VEHICLE HEATING OR AIR-CONDITIONING SYSTEM

BACKGROUND OF THE INVENTION

The present invention relates to a desorbable sorption filter, in particular for a heating or air-conditioning system of a motor vehicle, and to a method for producing the sorption filter.

A present day motor vehicle air-conditioning system serves, inter alia, to increase comfort in terms of air temperature, atmospheric humidity and air quality. In addition to the functions of ventilation, heating and cooling of the passenger compartment, an important role of the system is to remove solid and gaseous odorous and irritating substances and pollutants as well as atmospheric humidity, a function which affects not only the comfort but also the safety and health of the passengers during travel.

To clean the air, particle filters are used for the solid constituents, and sorption filters, for example, activated carbon filters, are used for separating out undesirable gases.

Foamed polyurethane filters laden with activated carbon are known. These filters are designed as simple disposable filters and have to be exchanged regularly, in order to maintain a sufficient filter action over a prolonged period. Therefore, they have to be arranged at a readily accessible point inside the air-conditioning system. In addition, these filters do not comply with the growing trends toward maintenance-free vehicles and preservation of resources. Finally, exceeding the maintenance intervals is harmful to health.

For this reason, desorbable filter designs have been proposed. With these it is possible, in principle, to considerably extend the filter service life, so that it is possible to produce a lifetime filter, i.e., a filter which does not have to be exchanged throughout the life of a motor vehicle. For this purpose, the filter structure has to be heated to temperatures of around 200° C. at certain intervals, in order to expel the ad- and/or absorbed pollutants. Currently three possible routes are essentially being followed with designs of this type, but all these routes have various drawbacks.

DE 43 04 077 and DE 195 12 844 disclose filters which can be desorbed indirectly by means of hot air. However, the energy consumption required for desorption is unacceptably high on account of large amounts of air being heated. Moreover, the hot air means that a large amount of heat is entrained, and consequently relatively large parts of the system have to be able to withstand high temperatures.

Furthermore, activated carbon filters in which the activated carbon can be heated directly by the flow of current are known. Currently, these directly heatable activated carbon fabric filters are very expensive and difficult to produce. Moreover, their mechanical stability in operation is low. Although this problem can be alleviated by constructing a laminate comprising activated carbon fabric, supporting fabric and/or a nonwoven, this increases the costs and the flow resistance. In addition, providing good electrical contact between the fabric and metallic current supply conductors over a prolonged period of time is very difficult. Furthermore, over the course of time, oxidation may cause the electrical resistance to rise, which may lead to inhomogeneity in the current density distribution. In this case, temperature monitoring becomes more difficult and there is an increased risk of "hot spots" being formed. A further drawback is the relatively small amount of carbon in thin fabrics, requiring low flow velocities and relatively short adsorption/desorption cycles. High gas concentrations may cause the small amount of carbon to become saturated excessively quickly under certain circumstances, which may cause the filtering capacity to be lost. This has the effect of reducing comfort, for example, in the event of odor-intensive pollution peaks, as occur frequently in traffic.

Finally, DE 42 25 272 A1 and DE 195 17 016 A1, for example, disclose sorption filters in which carbon granules are applied to electrically heatable metal support structures by means of special adhesives. DE 42 25 272 A1 discloses an adsorption filter which comprises a two- or three-dimensional support structure and adsorber grains fixed thereto. This support structure comprises an electrically conductive material and is heated by current flowing through it. In this way, it is possible to desorb the adsorber material. DE 195 17 016 A1 describes an air-treatment system, in particular for a vehicle interior, having at least two activated carbon filter units. In each case one unit is electrically heated, in an alternating manner, and the pollutants are carried away by an outgoing air stream. At the same time, the air stream which is to be treated is passed over the other filter unit, and is ultimately supplied to the vehicle interior. The activated carbon filter units have metallic support bodies around which the air flows and which are coated with activated carbon. The metallic support bodies are designed as electrical heating resistors, so that when current flows through them they are heated to a sufficient extent for the activated carbon to be desorbed. The disclosures of these documents are incorporated by reference herein.

Sorption filters of this type, in which the carbon can be heated by means of metal supports through which current can flow, can be produced at lower cost and are easier to make into a geometrically stable, pleated form. However, these have the drawback that the carbon granules, which are usually applied by special coating processes, in the small amounts of carbon applied, exhibit adsorption kinetics which are too low, therefore leading to high levels of immediate failure. The reasons for this is that the gases which are to be adsorbed have long diffusion paths to the micropores in the interior of the grains, and there are large air gaps between the individual activated carbon particles. Moreover, the adhesion of the individual carbon particles to the supports by means of an adhesive is often insufficient at elevated desorption temperatures of around 200° C. The use of an adhesive also causes fundamental problems because, either during the coating operation or during the heating operation to temperatures of around 200° C., foreign substances may evaporate out of the adhesive and may irreversibly contaminate the activated carbon. In operation, there are also problems with the heat insulation of the particles and with the long-term stability of the adhesion of the particles.

SUMMARY OF THE INVENTION

It is therefore one object of the invention to provide an improved, directly heatable sorption filter which in particular allows inexpensive production, good electrical contact and has good adsorption kinetics while dispensing with the use of adhesive systems altogether.

In accordance with one aspect of the present invention there has been provided a desorbable sorption filter, comprising: a metallic support comprised of a conductive metal, whereby the support can be heated by flow of electric current, and wherein the support includes a plurality of holding elements protruding therefrom; and an organic or inorganic adsorber mounted at or on the support, wherein the adsorber is of generally planar design and is mechanically connected to the support by means of the holding elements arranged on the support.

In accordance with another aspect of the invention, there has been provided a method for producing a sorption filter as described above, comprising: providing the adsorber; producing the support with the holding elements by stamping out junctions and deforming free ends of the support material which are formed as a result of the stamping; laying the adsorber onto the support and, optionally, a protective layer under the support; and connecting the support and adsorber by deforming the holding elements.

According to still another aspect of the invention, there has been provided a motor vehicle heating or air-conditioning system, comprising a heating or air-conditioning unit having an air inlet and an air outlet, and a sorption filter mounted in at least one of said air inlet and said air outlet, wherein the sorption filter comprises a filter as defined above.

Further objects, features and advantages of the present invention will become apparent from the detailed description of preferred embodiments that follows, when considered together with the accompanying figures of drawing.

DETAILED DESCRIPTION OF PREFERRED EMBODIMENTS

Figure 1:
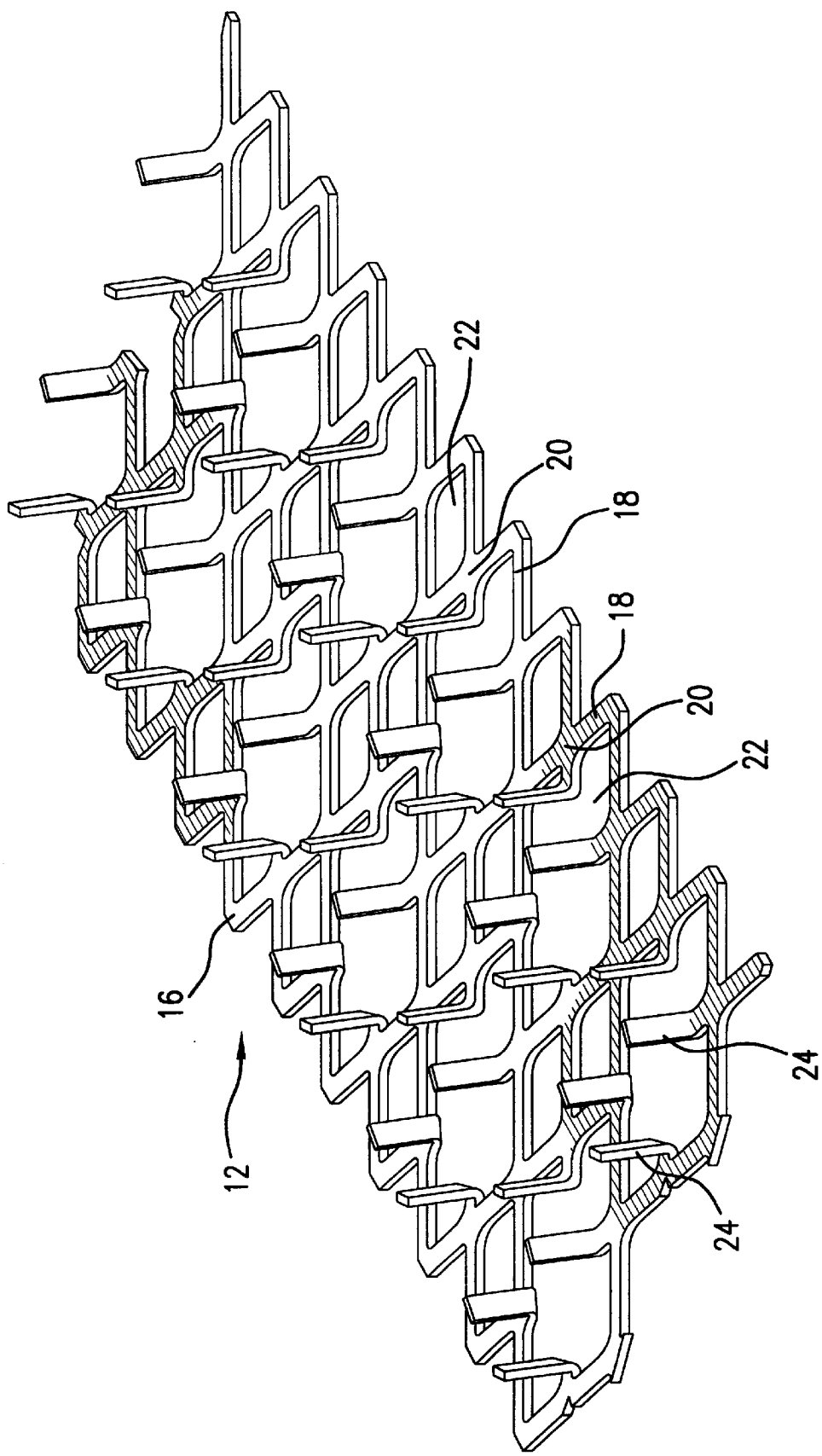
FIG. 1 is a perspective view of a metallic support of the sorption filter according to the invention.

The sorption filter according to the invention has a metallic support which can be heated by flow of current and an adsorber which is applied to the support. The adsorber is of planar design and is mechanically connected to the support by means of holding elements arranged on the support.

The possibility of using a planar adsorber material, on account of its moderate price, allows particularly inexpensive production of a regenerative filter. A relatively large amount of adsorbent material, for example, activated carbon, with a large primary surface and short diffusion paths can be accommodated, in comparison to known filters with carbon granules. Therefore, it is possible to achieve very low failure rates. On account of the indirect heating via the metallic support, any creeping oxidation and change in the electrical resistance of the adsorber cannot lead to problems with temperature control or even to "hot spots". Manufacture of the filter according to the invention can be automated at low cost. It can initially be produced in bulk sheets, after which it can be cut to the desired sizes and, if desired, pleated. Adhesives can be dispensed with altogether. On account of their thermal conductivity, the holding elements which hold the adsorber material make it easier to reach the desorption temperature quickly. The difficult problem of electrical contact by means of electric conductors is eliminated. The filter is mechanically stable in operation. The temperature of the filter in the desorption phase can be controlled reliably using simple contact sensors which are arranged in a thermally conductive manner on the metallic support.

A number of advantageous configurations of the invention form the various embodiments.

The support used is preferably a grid-like, metallic support, in particular an expanded metal grid. Expanded metal grids can be produced conventionally and with almost any desired mesh parameters. The use of expanded metal grids in desorbable filters forms the subject matter of German patent application DE 198 05 011, to which reference is hereby made and the content of which, in particular with regard to the expanded metal and its configurations, is hereby incorporated by reference in the present description.

Alternatively, it would also be possible to use a perforated sheet, a wire grid, a knitted wire fabric or the like as the support.

The holding elements are preferably formed out of the support material itself, for example, by stamping and/or deformation. Preferably, for example, as a result of junctions of the grid are stamped out and free ends of the support material, which are formed by the stamping, are bent over to form the holding elements, so that they project from the support grid in the manner of barbs. When the adsorber is laid onto the support, the barbs penetrate into the adsorber. In one embodiment, the barbs are subsequently deformed. This can be done, for example by pressing together the support and the adsorber which has been laid on top of it, e.g., by rolling. The bending barbs hook together with the adsorber, and the adsorber is securely connected to the support.

An adsorber can also be designed as an assembly of adsorber fibers, for example, as a woven, knitted or non-woven activated carbon fabric or felt. Such a fibrous adsorber can be produced at a very low cost and offers a very large primary surface with short travel paths for the pollutants to the sorption-active micropores. The result is rapid absorption kinetics and low failure rates.

If the sorption filter additionally has a layer which covers the adsorber and is likewise mechanically connected to the support, it is possible to prevent fibers which have become detached from the adsorber from entering the vehicle interior. In the production process, the additional covering layer can be connected to the support at the same time as the adsorber.

If appropriate, the sorption filter according to the invention may be of multilayer structure, in which case the support and adsorber layers are preferably arranged alternately.

In the description which follows, the invention is explained in more detail by reference to several exemplary embodiments and with reference to the drawings.

Figure 2:
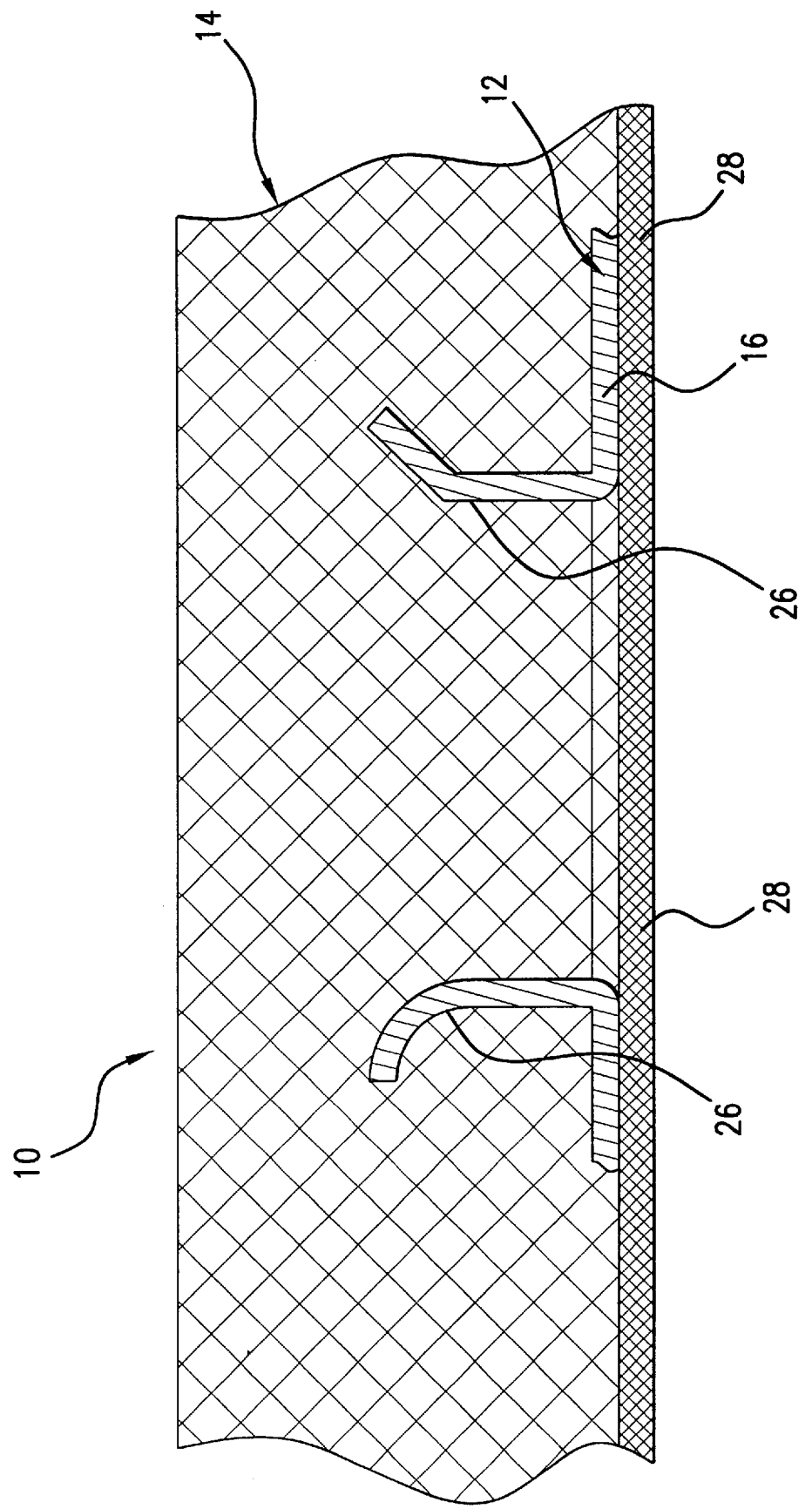
FIG. 2 is a cross section through the filter according to the invention.

FIG. 2 shows a filter 10 according to the invention, which is suitable in particular for filtering air in a heating or air-conditioning system of a motor vehicle. The filter has a metallic support 12, which can be heated by flow of current, and an adsorber 14 which is applied to the support 12.

FIG. 1 shows a first embodiment of the metallic support 12, comprising an expanded metal grid 16 which has a multiplicity of mesh-like grid webs 18 which intersect one another at junctions 20 and between which openings 22 are formed. This expanded metal grid 16 serves as a support structure for the adsorber 14.

Some of the junctions 20 are stamped out, and free ends 24 of the grid webs 18 formed by the stamping are bent approximately vertically out of the plane of the support. These free ends 24 project from the support 12 in the manner of barbs (FIGS. 1 and 3).

The adsorber 14, which preferably contains activated carbon and may consist entirely of activated carbon, is in planar form, for example, as an assembly of adsorber fibers, such as a woven, knitted or nonwoven fabric, shown schematically in the drawing.

Figure 4:
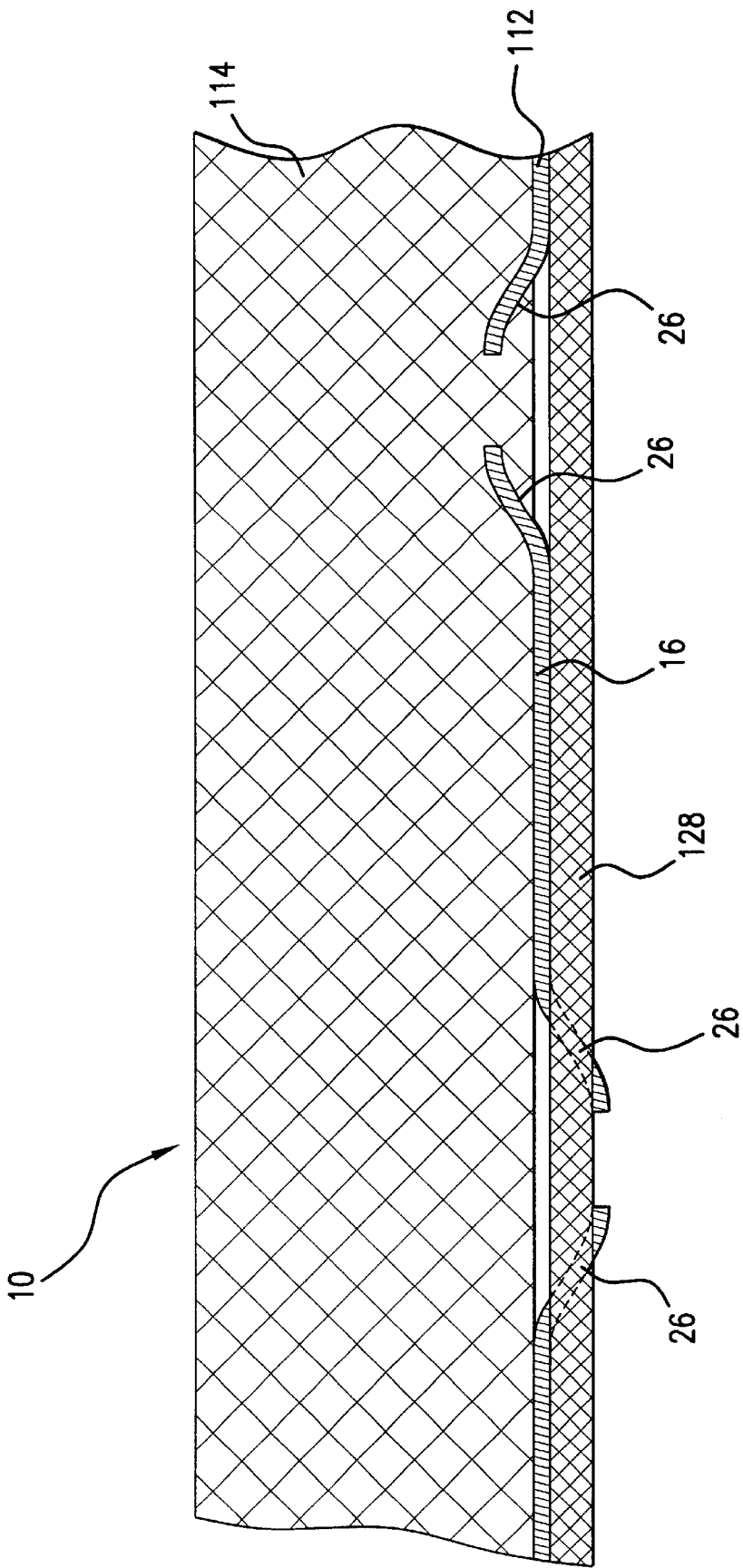
FIG. 4 is a cross section through an embodiment of the filter according to the invention having a support as shown in FIG. 3;.

During production, the planar adsorber 14 is laid on top of the support 12, with the barb-like free ends 24 penetrating into the adsorber material. Then, the support 12 and the adsorber 14 are pressed together, for example, by rolling or pressing, during which process the barb-like ends 24 are deformed, to form holding elements 26 which hook together with the adsorber 14 and hold it securely on the support 12, as shown in FIG. 2. The distances between adjacent hooking points are selected in conjunction with the mesh width of the expanded metal grid 16 in such a way that the electrically heated expanded metal grid 16 has a suitable electrical resistance and such that a homogeneous desorption temperature is established over the entire area of the planar adsorber 14. In addition, the sorption filter 10 according to the invention may have a covering layer 28, which covers the adsorption filter 10, on at least one side of the filter 10, preventing any fibers from the adsorber 14 from being expelled from the filter 10 by the air stream. The covering layer 28 may be held in the same way as the adsorber 14, by means of the holding elements 26 (FIG. 4). The covering layer 28 may comprise, for example, woven polyester or glass fiber, planar activated carbon material in paper form, and the like.

Figure 3:
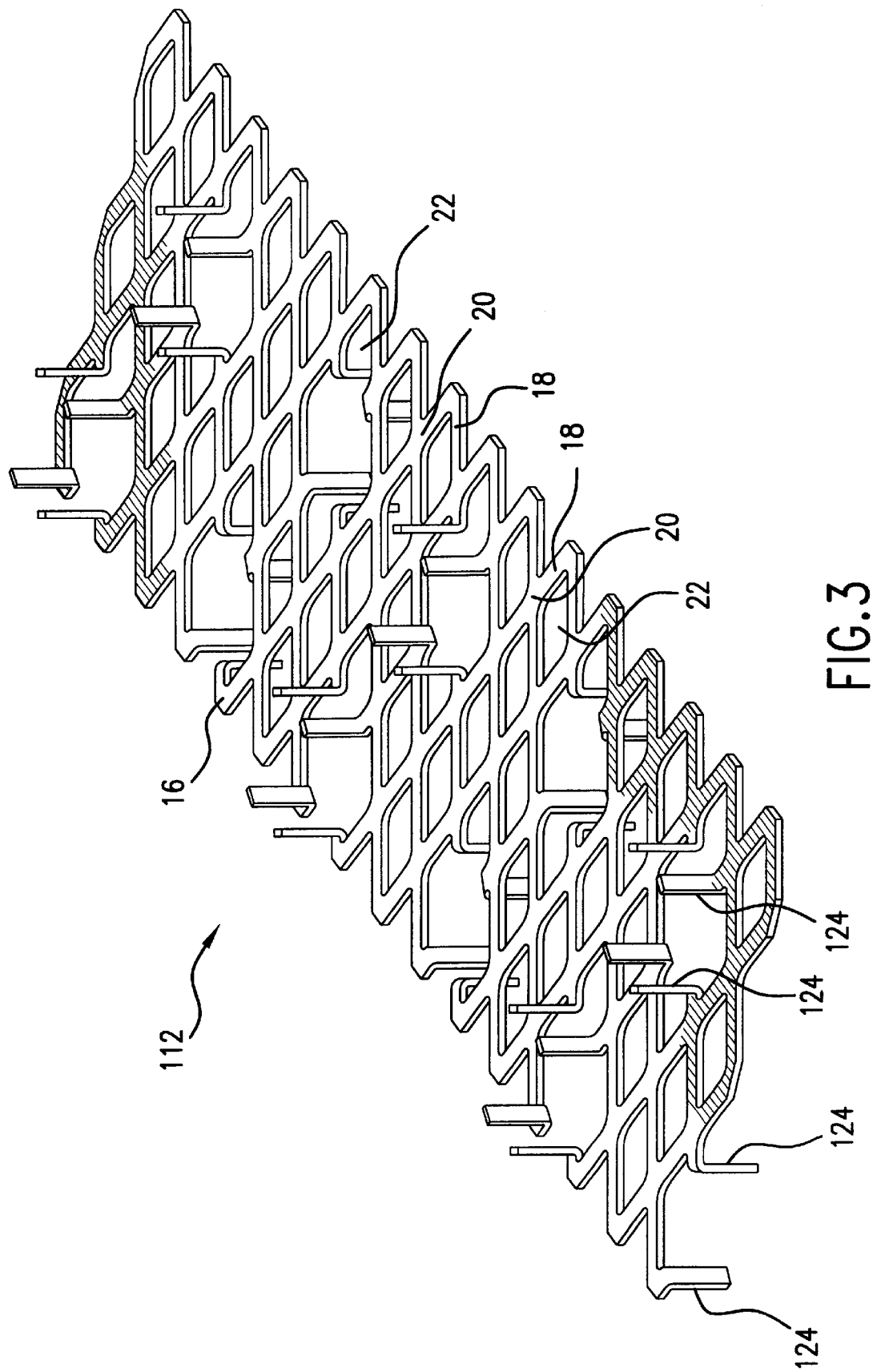
FIG. 3 is a perspective view of a second embodiment of the supports.

FIG. 3 shows a support 112, wherein the free ends 124 of the grid webs 18, which are formed by stamping, are bent over on both sides of the support 112. In this way so that the adsorber 114 on one side and the covering layer 128 on the other side are held in the same way (FIG. 4).

It is also possible for more than one layer of adsorber to be held on the same side of the support 12 by means of the holding elements 26. The holding elements would then have to be long enough to be able to secure all the layers. It would also be possible for a plurality of supports and adsorbers to be provided in parallel, arranged alternately, in which case the supports are connected to the adjacent adsorber by means of the holding elements.

The sorption filter 10 according to the invention can be produced in large pieces and can then be cut to a desired size. The sorption filter can also be pleated.

The number of stamped-out junctions allows the electrical resistance of the support to be adjusted. In this case, it is necessary, on the one hand, to ensure that not too many junctions are stamped out, for strength reasons, while on the other hand that not too few junctions are stamped out, so that it is possible to form sufficient holding elements to hold the adsorber. In a further embodiment, it is not entire junctions which are stamped out, but rather, for example, only a few grid webs which are severed and the two free ends formed by the severing are deformed into holding elements.

Even during the process of producing the grid, it is furthermore possible for individual webs to be cut through and correspondingly deformed, in such a way that a grid with barbs which project at right angles is formed.

In a further embodiment, it is possible for metallic conductor tracks to be removed from the expanded metal grid at regular intervals, in order to set its electrical resistance to a desired level.

In one embodiment of the invention, the support is a perforated sheet, a wire grid, a knitted wire fabric or the like. Holding elements can be produced in accordance with the invention from all these supports by stamping out and deforming those ends of the grid webs which have been released by the stamping.

When the sorption filter according to the invention is used, the expanded metal grid used for supporting and heating is preferably situated on the downstream airside.

It is apparent to those skilled in the art that the invention can take many different forms than those preferred embodiments described above, and that various modifications can be made to the described embodiments without departing from the concept of the present invention. Therefore, it is to be understood that the appended claims are to be interpreted broadly enough to encompass all further embodiments and modifications of the present invention.

The entire disclosure of the priority application, German Patent Application No. 100 01 043.1 filed on Jan. 13, 2000, is hereby incorporated by reference.

What is claimed is:

1. A desorbable sorption filter, comprising:
    a metallic grid support comprised of a conductive metal, whereby the support can be heated by flow of electric current, and wherein the metallic grid support includes a plurality of holding elements formed integrally from the metallic grid and protruding therefrom;
    means for heating the support by the flow of electric current; and
    an organic or inorganic adsorber mounted at or on the support, wherein the adsorber is of generally planar design and is mechanically connected to the support by means of the holding elements arranged on the support.

2. A sorption filter as claimed in claim 1, wherein the holding elements are designed as hooks.

3. A sorption filter as claimed in claim 1, wherein the holding elements are formed out of the support material by stamping and/or bending.

4. A desorbable sorption filter as claimed in claim 1, wherein the metallic grid support comprises an expanded conductive metal grid.

5. A sorption filter as claimed in claim 1, wherein the holding elements are formed by stamping out junctions to form free ends and bending the free ends of the support material which are formed as a result of the stamping.

6. A sorption filter as claimed in claim 1, wherein the metallic grid support comprises a perforated sheet, a wire grid, or a knitted wire fabric.

7. A sorption filter as claimed in claim 1, wherein the adsorber comprises an assembly of adsorber fibers.

8. A sorption filter as claimed in claim 7, wherein the adsorber comprises a woven, knitted or nonwoven adsorber fabric.

9. A sorption filter as claimed in claim 1, wherein the adsorber contains activated carbon.

10. A sorption filter as claimed in claim 1, wherein the support and adsorber of the filter are pleated.

11. A sorption filter as claimed in claim 1, comprising an adsorber layer on both sides of the support.

12. A sorption filter as claimed in claim 1, further comprising a covering layer mechanically connected to the support for retaining fibers which have become detached from the adsorber.

13. A sorption filter as claimed in claim 1, which comprises a plurality of alternately arranged supports and adsorber layers.

14. A method for producing a sorption filter as claimed in claim 1, comprising:

provide the adsorber;

producing the support with the holding elements by stamping out junctions and deforming free ends of the support material which are formed as a result of the stamping;

laying the adsorber onto the support and, optionally, a protective layer under the support; and connecting support and adsorber by deforming the holding elements.

15. A method as claimed in claim 14, wherein the holding elements are deformed by rolling or pressing.

16. A method as claimed in claim 14, wherein the adsorber comprises an assembly of adsorber fibers selected from a woven activated carbon fabric, a nonwoven which contains activated carbon, or some other fibrous base material which contains carbon, said fibers being obtained by coking and activation of textile yarns, cords, wicks, ropes or other bundles of fibers.

17. A motor vehicle heating or air-conditioning system, comprising a heating or air-conditioning unit having an air inlet and an air outlet, and a sorption filter mounted in at least one of said air inlet and said air outlet, wherein the sorption filter comprises a filter as defined by claim 1.

18. A motor vehicle heating or air-conditioning system as claimed in claim 17, wherein the sorption filter further comprises a covering layer mechanically connected to the support for retaining fibers which have become detached from the adsorber, and the covering layer is positioned at the downstream air side of the filter.

* * * * *